United States Patent [19]

Bürge et al.

[11] Patent Number: 4,507,154

[45] Date of Patent: Mar. 26, 1985

[54] CHLORIDE-FREE SETTING ACCELERATOR FOR HYDRAULIC BINDING AGENTS

[75] Inventors: Theodor Bürge, Geroldswil; Eugen Bodenmann, Zurich, both of Switzerland

[73] Assignee: Sika AG, vorm. Kaspar Winkler & Co., Zurich, Switzerland

[21] Appl. No.: 433,799

[22] Filed: Oct. 12, 1982

[30] Foreign Application Priority Data

Oct. 12, 1981 [CH] Switzerland ............ 6513/81

[51] Int. Cl.³ .............. C04B 7/35; C04B 11/10; C04B 13/21
[52] U.S. Cl. .................... 106/315; 106/90; 106/93; 106/111; 106/115; 106/119
[58] Field of Search ............ 106/109, 110, 111, 315, 106/90, 93, 115, 119

[56] References Cited

U.S. PATENT DOCUMENTS

| | | | |
|---|---|---|---|
| 2,216,555 | 10/1940 | King et al. | 106/315 |
| 4,082,563 | 4/1978 | Ellis et al. | 106/93 |
| 4,142,911 | 3/1979 | Ellis et al. | 106/111 |
| 4,209,335 | 6/1980 | Katayama et al. | 106/315 |
| 4,212,681 | 7/1980 | Simeonou et al. | 106/315 |
| 4,283,229 | 8/1981 | Girg et al. | 106/314 |

FOREIGN PATENT DOCUMENTS

| | | | |
|---|---|---|---|
| 2059074 | 6/1971 | Fed. Rep. of Germany | 106/315 |
| 2314904 | 2/1977 | France | 106/315 |
| 53-21220 | 2/1978 | Japan | 106/315 |
| 560852 | 8/1977 | U.S.S.R. | 106/315 |
| 697436 | 11/1979 | U.S.S.R. | 106/315 |

Primary Examiner—Gary P. Straub
Attorney, Agent, or Firm—Abelman Frayne Rezac & Schwab

[57] ABSTRACT

For the acceleration of the setting and of the hardening of a hydraulic binding agent such as cement, limestone, hydraulic limestone and gypsum as well as mortar and concrete prepared thereof, are added to the mixture, which contains said binding agent, from 0.5 to 10 percent by weight, referred to the weight of this binding agent, of an alkali-free setting- and hardening-accelerator, whereby this accelerator contains aluminum hydroxide.

6 Claims, 9 Drawing Figures

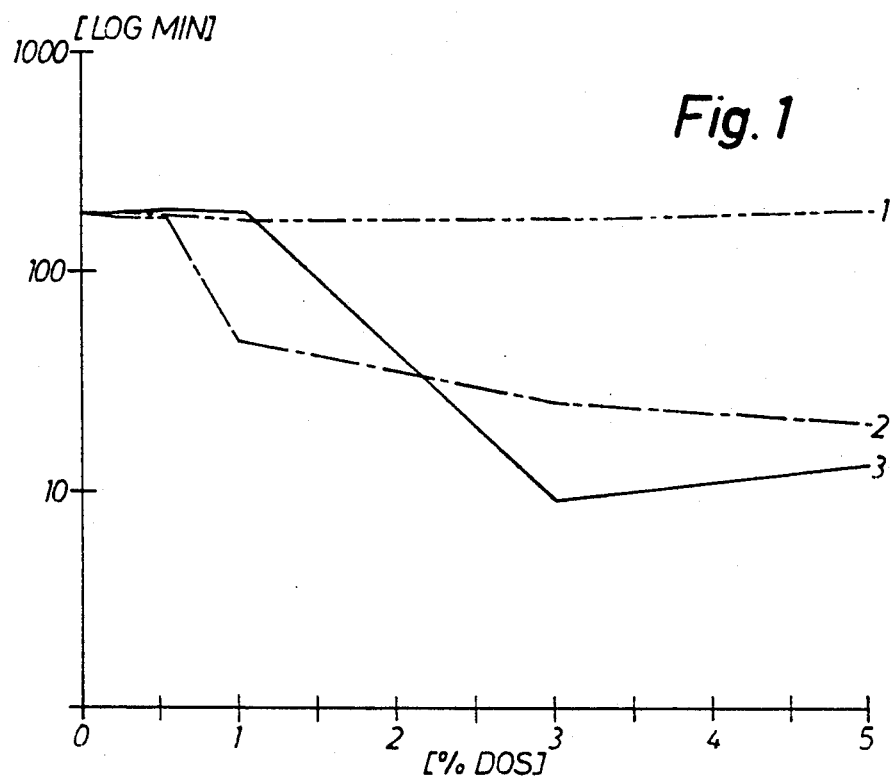
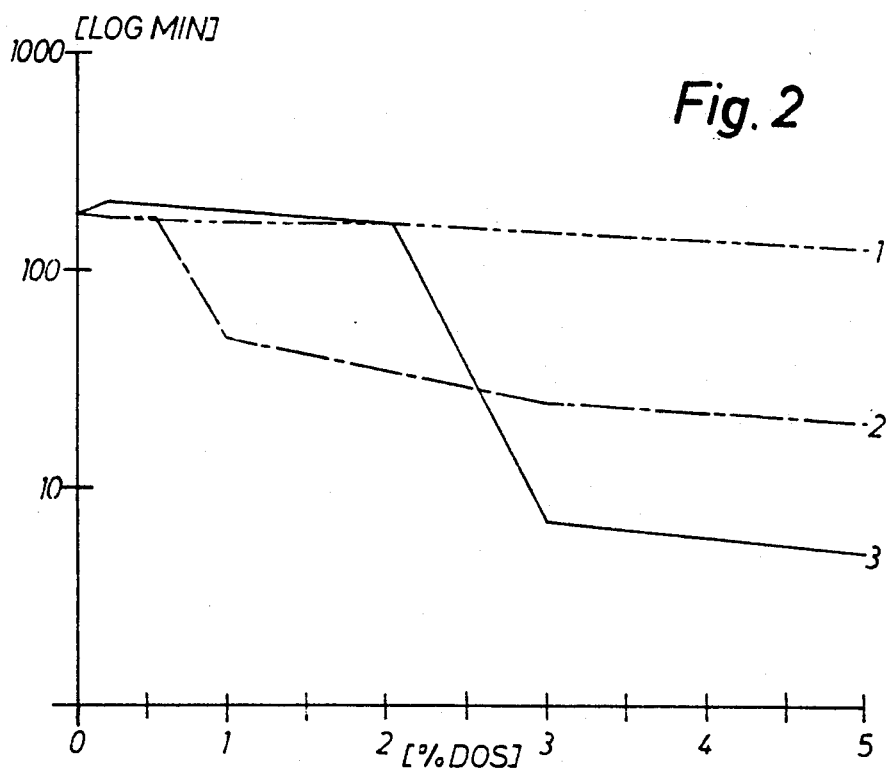

CHLORIDE-FREE SETTING ACCELERATOR FOR HYDRAULIC BINDING AGENTS

BACKGROUND OF THE INVENTION

1. Field of the Invention

According to the present invention there is provided a process for the acceleration of the setting of hydraulic binding agents such as cement and mortar and concrete prepared thereof. Possibilities for using this process are the preparation of prefabricated elements and the acceleration of concrete prepared at the construction site. In the former it may be used to shorten or even to eliminate the usual hardening acceleration by heat (electrical heating or oil heating or steam). In the latter the time for stripping the forms of the concrete may be shortened, or it is also possible to build with concrete at low temperature.

In all these cases the process of this invention shows remarkable economical advantages. A special field of the application is the spray mortar and the spray concrete.

Such mortars and concretes are used for the preparation of buildings of any structure above or below the ground as well as for the completion and the coating of subterranean, natural or artificial cavities, such as gallery-, tunnel- or mining-constructions, where the concrete must satisfy the statical requirements, and where the concrete must be waterproof. Such mortars and concretes are also used for the consolidation of excavations, slopes, loose rock walls etc.

2. Description of the Prior Art

There are already known many substances which accelerate the setting and the hardening of concrete: The most frequently used substances are among others the strong alkali reactive substances such as alkali hydroxides, alkali carbonates, alkali silicates, alkali aluminates and earth alkali chlorides.

The strong alkali reactive substances are accompanied with undesirable annoyances of the manufacturer. Such products may be very corrosive to the skin and may cause inflammations of the eyes, which may injure the strength of vision. By inhaling the dust produced by the work up of these products also harmful consequences to the respiratory organs may be caused.

Seen from the technological standpoint of the concrete the strong alkali setting accelerators reduce the end stability and increase the shrinkage, which may lead to the formation of cracks and which, therefore, calls in question the permanence of a building.

As a rule, the chloride containing setting accelerators are not desired at the construction site because they may lead to corrosion of the reinforcing bars in the concrete as well as of the equipment used at the construction site.

Furthermore, it is known that the chloride containing setting accelerators strongly reduce the stability against chemicals, especially the sulfate stability of the concrete.

SUMMARY OF THE INVENTION

Surprisingly, the inventors found that totally alkali-free and chloride-free setting accelerators are producible, which therefore do not irritate the skin and the eyes and which do not promote the corrosion.

Hence, it is a general object of the invention to provide an improved process for the acceleration of the setting and of the hardening of a hydraulic binding agent, such as cement, limestone, hydraulic limestone and gypsum as well as of mortar and concrete prepared therefrom.

It is a further object of this invention to provide an alkali-free setting- and hardening-accelerator.

The invention will be better understood and objects other than those set forth above will become apparent when consideration is given to the following detailed description thereof.

DETAILED DESCRIPTION OF THE INVENTION

Because the setting accelerators of this invention do not contain any alkalis, neither the stability development nor the shrinkage is negatively influenced. These setting accelerators consist totally or partly of finely divided amorphous aluminium hydroxide. By mixing the amorphous aluminium hydroxide with the water soluble sulfates, nitrates, and formates of the earth alkali metals and of the transition metals the setting accelerating effect to the concrete may be increased in an unexpected degree. In these mixtures the amount of aluminium hydroxide may be reduced below its half, and the setting acceleration remains equal.

The soluble salts of sodium or potassium or mixed salts, e.g. alums, sodium aluminium sulfate or potassium aluminium sulfate (all prior art), also show an analogous effect.

In order to avoid the dust formation when using the setting accelerators of this invention water swelling substances, such as methyl-, hydroxyethyl-, hydroxypropyl-, hydroxybutyl-, hydroxyethylmethyl-, hydroxypropylmethyl-, or hydroxybutylmethyl-celluloses and others, may be added.

The following examples shall illustrate this invention:

Procedure 100 g Portland cement and 100 g finely ground quartz (6400 mesh) are mixed in a dry state. Then the necessary amount of setting accelerator and 55 ml water are added and the composition is mixed for 30 seconds. From the resulting mortar mixture are measured the setting times according to VICAT according SIA NORM 215 or DIN 1164. All results are shown in the figures. There are shown the setting times of pure aluminium hydroxide, of the water soluble salts, and of a combination of the above two components of equal parts by weight.

Surprisingly, there was always found an increased setting acceleration of the combination, and this was not foreseeable.

EXAMPLES (Results see FIGS. 1-9)

Figure 3:
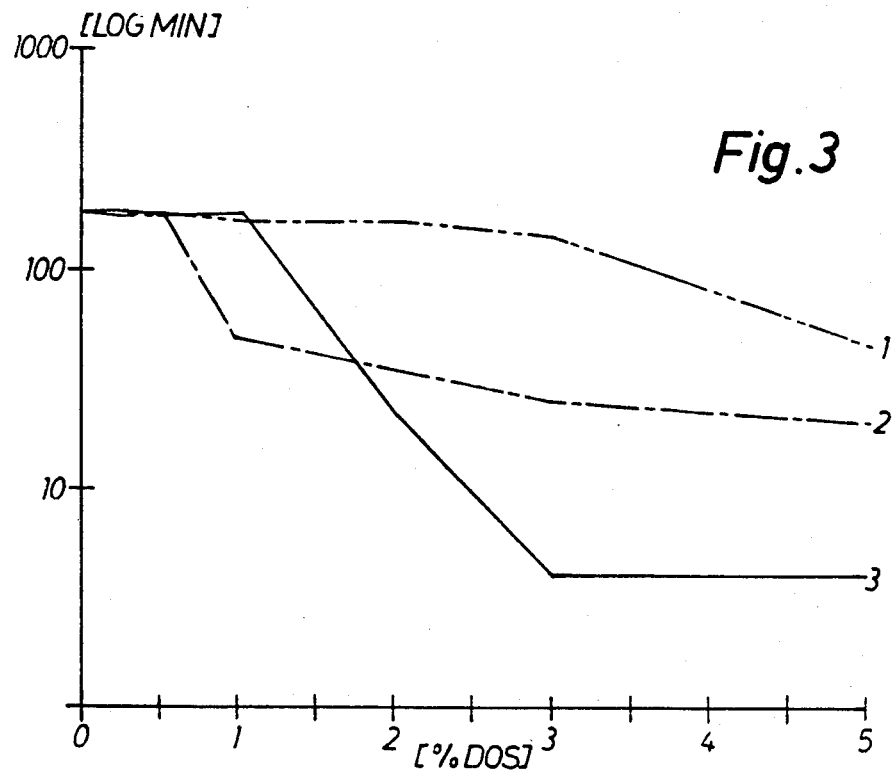
Figure 4:
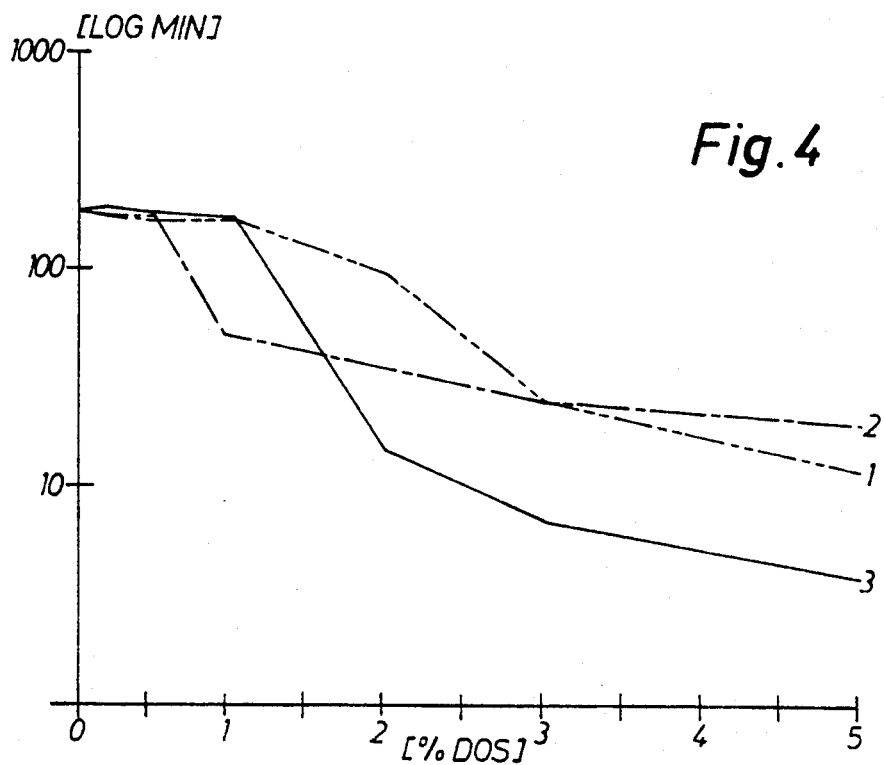
Figure 5:
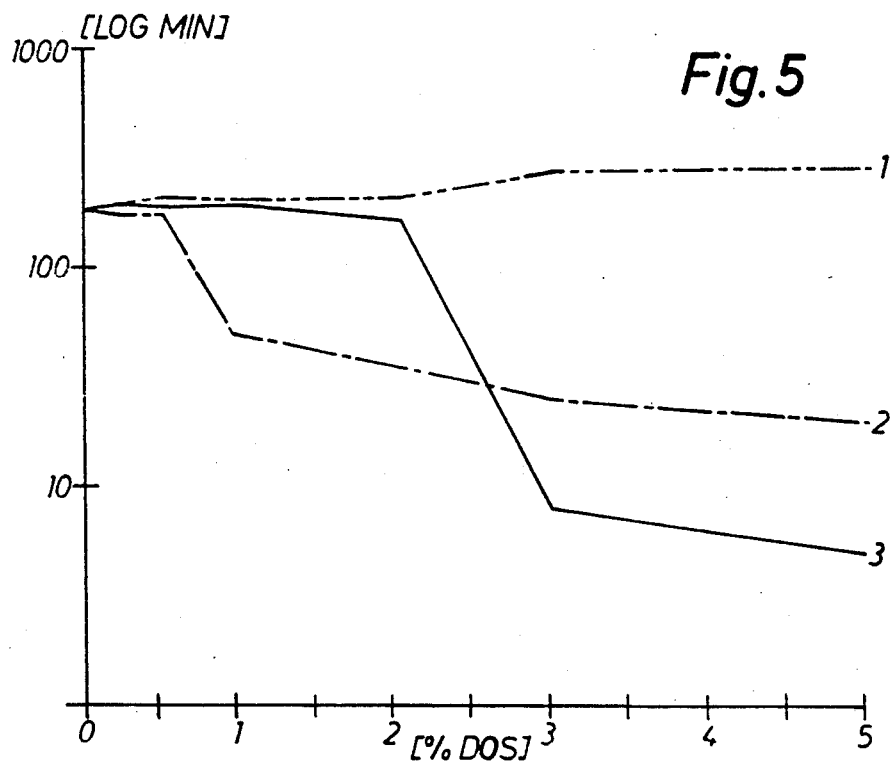
Figure 6:
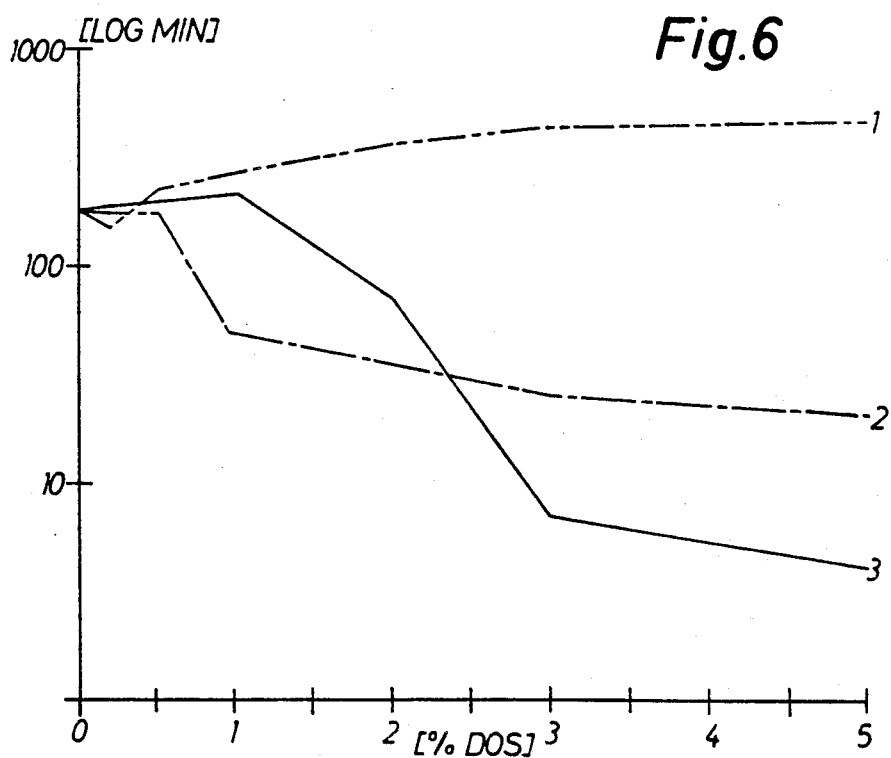
Figure 7:
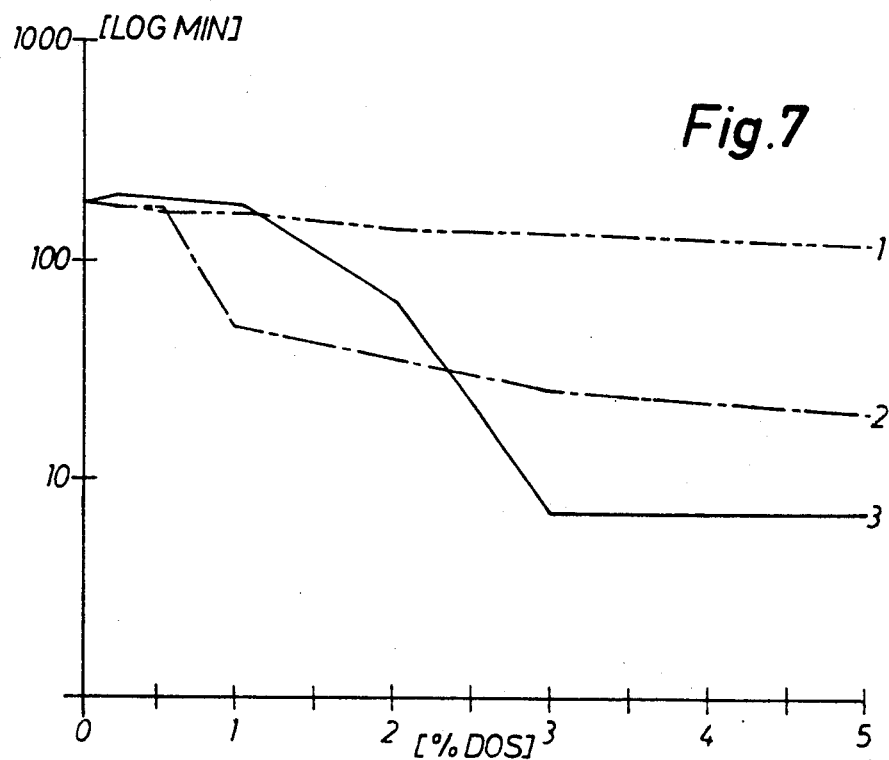
Figure 8:
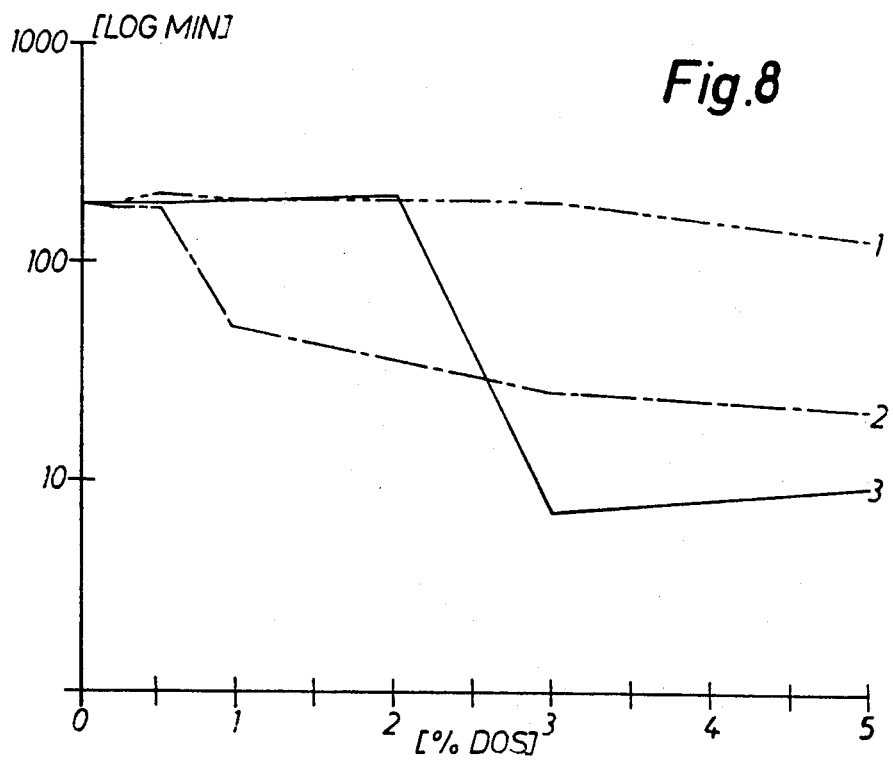
Figure 9:
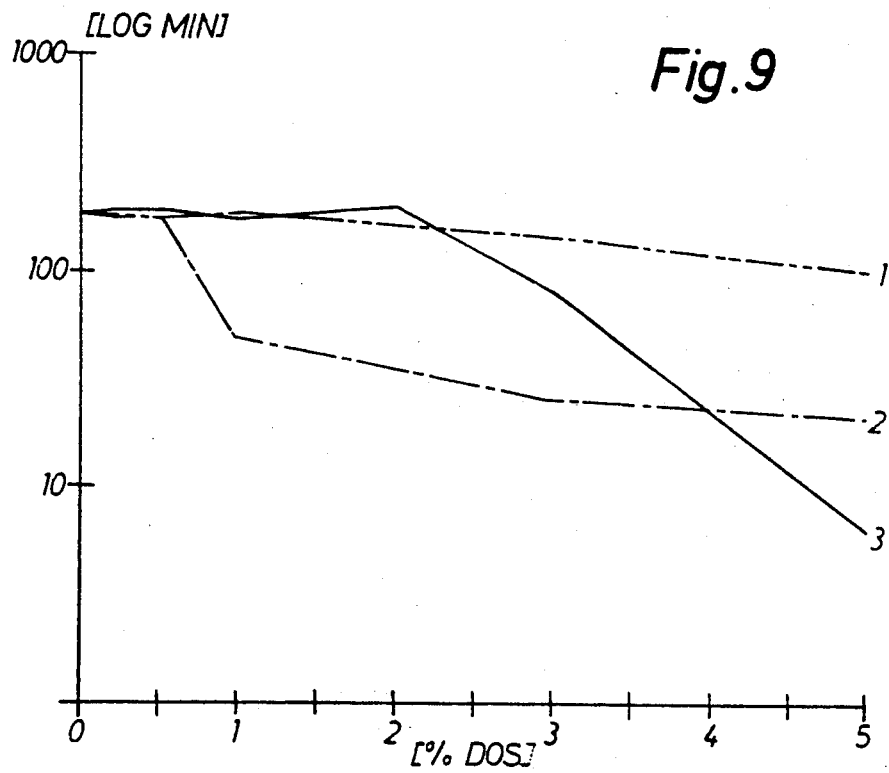

No. 1  Influence of sodium nitrate (prior art) (see FIG. 1)
No. 2  Influence of calcium nitrate (see FIG. 2)
No. 3  Influence of potassium aluminium sulfate (prior art) (see FIG. 3)
No. 4  Influence of aluminium sulfate (see FIG. 4)
No. 5  Influence of magnesium sulfate (see FIG. 5)
No. 6  Influence of iron sulfate (see FIG. 6)
No. 7  Influence of sodium sulfate (prior art) (see FIG. 7)
No. 8  Influence of potassium sulfate (prior art) (see FIG. 8)
No. 9  Influence of sodium formiate (prior art) (see FIG. 9).

In the examples 1-9 the ratio of PC:finely ground quartz=1:1 and W/Z=0.55 at the setting beginning.

In the FIGS. 1-9 curve 1 shows the setting time of the used water soluble salts mentioned above in the corresponding example, curve 2 shows the setting time of pure aluminium hydroxide (Al(OH)$_3$), and curve 3 shows the setting time of a 1:1 combination (parts by weight) of the above mentioned salts and of Al(OH)$_3$.

According to the desired setting times or according to the requirements from the practice, the most desirable combinations may be selected. The choice depends also on the working method in consideration, e.g. transportation concrete, location concrete, prefabrication or spray concrete.

EXAMPLE No. 10

A mortar mixture of 3 parts by weight of sand and 1 part by weight of Portland cement with the addition of 5% of a conventional, alkali-based accelerator was sprayed. There was used a mortar spray machine type ALIVA 240 with one liter rotor. After 24 hours there were taken boring kernels of the hardened spray mortar and after different times the crushing strength was measured.

EXAMPLE No. 11

The same experiment as in example no. 10, but there were used 5% of an alkali-free setting accelerator according to this invention.

The measurement of the crushing strength of examples nos. 10 and 11 gave the following results in MPa (mean value of three boring kernels).

| Age of the boring kernel | Conventional setting accelerator | Alkali-free setting accelerator according to this invention |
|---|---|---|
| 1 day | 11.5 | 15.8 |
| 3 days | 15.9 | 34.8 |
| 7 days | 20.2 | 42.9 |
| 28 days | 32.8 | 50.8 |
| 56 days | 34.5 | 52.3 |
| 90 days | 34.0 | 54.5 |
| 180 days | 33.3 | 63.1 |

The positive influence of the alkali-free setting accelerator upon the crushing strength is obvious.

There was also observed a favorable influence on the shrinkage behavior. With the alkali-free setting accelerator the shrinkage after 28 days was about 30% smaller.

EXAMPLE NO. 12

A mortar mixture as described in example no. 10 was sprayed in one case with a conventional setting accelerator. In the other case the same amount of a setting accelerator according to this invention was used, and previously there were added 10% of a methyl cellulose. By the aid of a "massometer" the dust concentration was measured during the spraying. The location of measurement was 0.5 m behind the nozzle holder. The overall dust measurement was carried out 30 seconds after the beginning of the spraying. The second measurement, where the dust was measured which enters the lungs (and may effect a silicose) and which has a particle size <5μ, began 2 minutes after the first measurement.

| Additive | Dust concentration in mg/m$^3$ air | |
|---|---|---|
| | Total dust | Particles <5μ |
| Before spraying | 0.06 | — |
| Without | 17.5 | 8.9 |
| Conventional setting accelerator | 17.7 | 8.4 |
| Setting accelerator according to this invention | 3.8 | 2.6 |

With the additive according to this invention the acceptable limiting value MAK of 8 mgr/m$^3$ air has clearly fallen below.

In the process of this invention there is used a setting accelerator of 10–100% amorphous aluminium hydroxide and 0–90% of a water soluble sulfate, nitrate or formate and 0–50% of a swellable polymer in an amount of 0.1–10%, referred to the weight of the cement.

Of course these additives may also be premixed together with hydraulic binding agent and additive materials and may be used in the so-called finished mortar.

What is claimed is:

1. A process for the acceleration of the setting and of the hardening of a hydraulic binding agent, such as cement, limestone, hydraulic limestone and gypsum as well as mortar and concrete prepared thereof, characterized in that there are added to the mixture containing said binding agent, from 0.5 to 10 percent by weight of said binding agent, of (an alkali metal ion-free and) a chloride-free setting- and hardening-accelerator, wherein said accelerator contains at least 10% by weight of powdered aluminum hydroxide,
   at least some to 90% by weight of at least one
      water soluble sulfate, nitrate or formate salt of calcium, magnesium, iron or aluminum, and
   at least some to 30% by weight of at least one swellable
      polymer selected from the group consisting of methyl-, hydroxyethyl-, hydroxypropyl-, hydroxybutyl, hydroxyethylmethyl-, hydroxypropylmethyl-, and hydroxybutylmethyl-cellulose, the sum of these accelerator ingredients totaling 100%.

2. The process of claim 1, characterized in that said aluminum hydroxide is finely divided and has a grain size from 0.1 to 5 μm.

3. The process according to claim 2, characterized in that the setting- and hardening-accelerator is used in the form selected from a powder or is in finely dispersed form in water.

4. The process according to claim 3, characterized in that the setting- and hardening-accelerator is used premixed in hydraulic binding agents and additive materials.

5. A chloride-free setting- and hardening-accelerator, wherein said accelerator contains at least 10% by weight of powdered aluminum hydroxide,
   at least some to 90% by weight of at least one water soluble sulfate, nitrate or formate salt of calcium, magnesium, iron and aluminum, and
   at least some to 30% by weight of at least one swellable polymer selected from the group consisting of methyl-, hydroxyethyl-, hydroxypropyl-, hydroxybutyl-, hydroxyethylmethyl-, hydroxypropylmethyl-, and hydroxybutylmethyl-cellulose, the sum of these accelerator ingredients totaling 100%.

6. A setting- and hardening-accelerator according to claim 5, characterized in that it contains amorphous finely divided aluminum hydroxide having a grain size from 0.1 to 5 μm.

* * * * *